United States Patent [19]

Jagadish et al.

[11] Patent Number: 6,058,170
[45] Date of Patent: *May 2, 2000

[54] TELEPHONE BILLING WITH SUMMARY INFORMATION

[75] Inventors: Hosagrahar V. Jagadish; Inderpal S. Mumick, both of Berkeley Heights, N.J.

[73] Assignee: AT&T Corp, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/813,395

[22] Filed: Mar. 10, 1997

[51] Int. Cl.⁷ .................................................. H04M 15/00
[52] U.S. Cl. ......................... 379/114; 379/112; 379/115; 379/126
[58] Field of Search .................. 379/111–115, 118–119, 379/120–121, 116, 126, 135, 130, 133–134, 127, 131

[56] References Cited

U.S. PATENT DOCUMENTS

| | | |
|---|---|---|
| 4,776,004 | 10/1988 | Bauer et al. ............................ 379/127 |
| 4,979,207 | 12/1990 | Baum et al. . |
| 5,146,491 | 9/1992 | Silver et al. . |
| 5,206,899 | 4/1993 | Gupta et al. ............................ 379/120 |
| 5,222,125 | 6/1993 | Creswell et al. . |
| 5,291,543 | 3/1994 | Freese et al. . |
| 5,325,421 | 6/1994 | Hou et al. ............................ 379/88.03 |
| 5,353,335 | 10/1994 | D'Urso et al. .......................... 379/115 |
| 5,381,467 | 1/1995 | Rosinski et al. . |
| 5,384,831 | 1/1995 | Creswell et al. . |
| 5,450,477 | 9/1995 | Amarant et al. . |
| 5,506,893 | 4/1996 | Buscher et al. . |
| 5,517,555 | 5/1996 | Amadon et al. ........................ 379/112 |
| 5,544,229 | 8/1996 | Creswell et al. . |
| 5,553,131 | 9/1996 | Minervino, Jr. et al. . |
| 5,557,664 | 9/1996 | Burns et al. . |
| 5,568,541 | 10/1996 | Greene . |
| 5,577,101 | 11/1996 | Böhm . |
| 5,579,379 | 11/1996 | D'Amico et al. . |
| 5,581,607 | 12/1996 | Richardson, Jr. et al. . |
| 5,592,537 | 1/1997 | Moen . |
| 5,692,037 | 11/1997 | Friend ..................................... 379/130 |
| 5,754,634 | 5/1998 | Kay et al. ............................... 379/134 |

FOREIGN PATENT DOCUMENTS

| | | |
|---|---|---|
| 452 591 A2 | 10/1991 | European Pat. Off. . |
| WO 95/24093 | 9/1995 | WIPO . |
| WO 97/05734 A1 | 2/1997 | WIPO . |

OTHER PUBLICATIONS

J.L. Hancock, "Billing Development in a US Regional Bell Operating Company", *British Telecommunications Engineering*, vol. 11, Jan. 1993, pp. 252–261.

*Primary Examiner*—Curtis A. Kuntz
*Assistant Examiner*—Duc Nguyen

[57] ABSTRACT

A method and system for automatically generating telephone bills that include customer defined or requested summary information. Customer specific data including pricing data and summary parameters are stored. A plurality of records, each record describing a telephone call, are generated. The record is received at a billing analysis system, which determines a priced call value for each call using the record and the customer specific data and determines summary information for the customer using the record, the priced call values and the summary parameters. A telephone bill for the customer is generated based on the summary information for the customer. The bill may be generated periodically, on a predetermined schedule, or upon demand of the customer. Online access to summary information is also provided.

27 Claims, 4 Drawing Sheets

TELEPHONE BILLING WITH SUMMARY INFORMATION

FIELD OF THE INVENTION

The present invention relates to the processing of telephone calls, and in particular, to the billing of the costs of such calls.

BACKGROUND OF THE INVENTION

Telephone bill summary information is useful for a variety of purposes. For example, bill summary information may be used to automatically debit accounts for payment, to distribute charges to those who incurred them, and for cost tracking and reduction. Conventional telephone bills provide standard summary information, such as the total charges due. The customer who receives the bill has no control over the summary information presented on the bill and cannot define or request custom summary information to appear on the bill. Recipients of such bills must themselves generate the summary information they need. It would be useful if bills including the desired customer defined or requested summary information were automatically generated by the telephone billing process.

Conventional telephone bills are generated periodically, but a need for the information on the bills may arise before the end of a period. For example, telephone bills are often generated monthly, but it may be desired to debit accounts more frequently. Likewise, in order to track or reduce costs, billing information, and in particular, billing summary information, may be need more frequently than bills are generated, or even on demand. It would be useful if telephone billing summary information were available in real-time.

SUMMARY OF THE INVENTION

The present invention is a method and system for automatically generating telephone bills that include customer defined or requested summary information.

In order to bill for telephone service according to the present invention, customer specific data including pricing data and summary parameters are stored. A plurality of records, each record describing a telephone call, are generated. The record is received at a billing analysis system, which determines a priced call value for each call using the record and the customer specific data and determines summary information for the customer using the record, the priced call values and the summary parameters. A telephone bill for the customer is generated based on the summary information for the customer. The bill may be generated periodically, on a predetermined schedule, or upon demand of the customer. Online access to summary information is also provided.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1A:
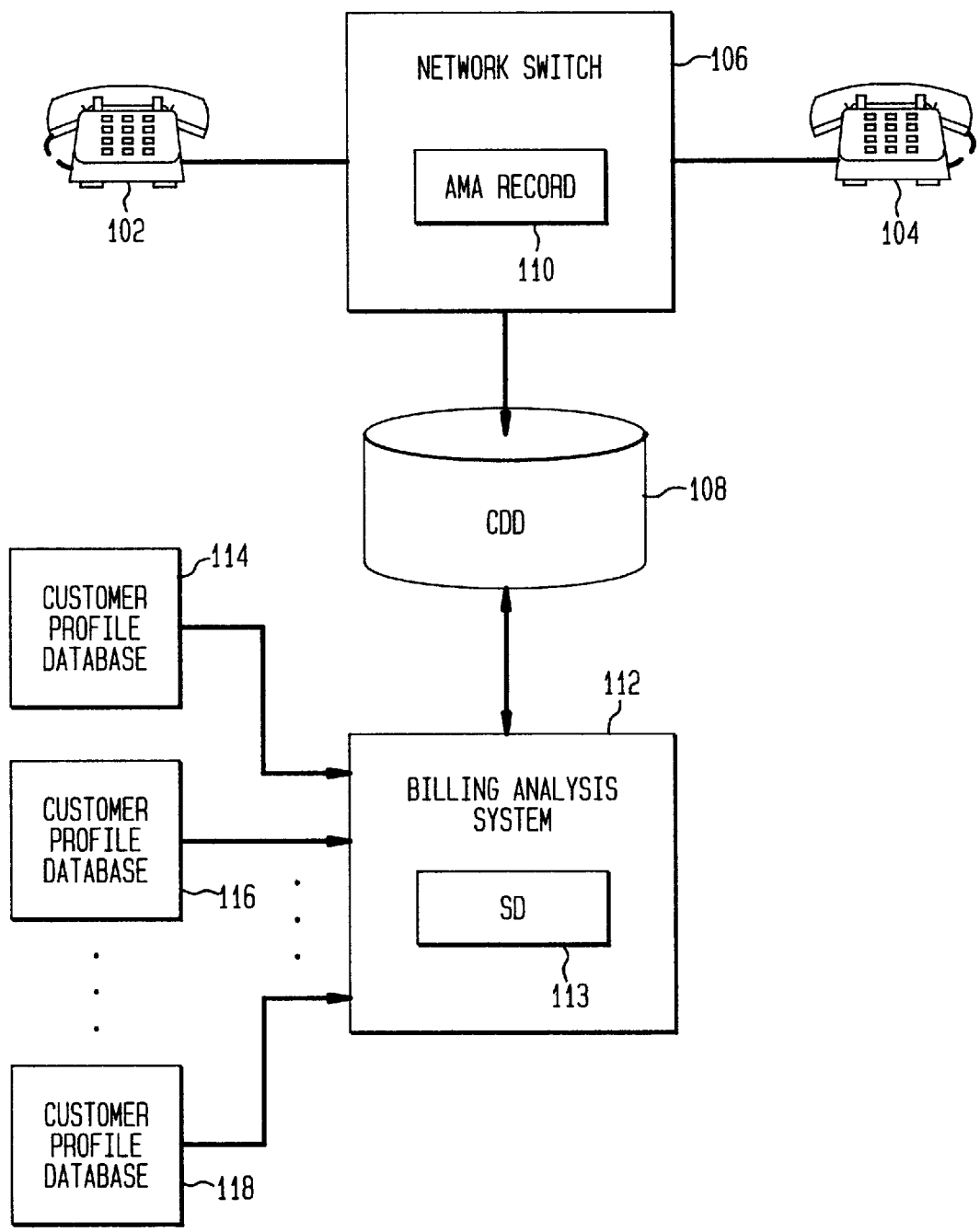
FIG. 1a is a block diagram of one embodiment a telephone call billing system, in which the present invention may be implemented.

Referring to FIG. 1a, there is shown a block diagram of a telephone system in accordance with one embodiment of the present invention. There is shown a calling telephone 102, a called telephone 104, a telephone network switch 106 and a Call Detail Database (CDD) 108. An Automatic Message Accounting (AMA) record, represented by a block 110, is also shown. As indicated by the figure, a billable call may be initiated at telephone 102 and routed through switch 106, e.g., an AT&T 4ESS® switch, to telephone 104. The switch generates AMA record 110, which includes the information necessary to rate the call. The AMA record is passed to CDD 108. It should be noted here that there are an abundance of protocols and transmission media that may be used for passing the data from the switch to the CDD. For example, suitable protocols include the well known File Transfer Protocol (FTP) and Transmission Control Protocol/Internet Protocol; and suitable transmission media include twisted shielded pair wires, fiber optic lines, coaxial cable, and wireless links. Moreover, these protocols and media are suitable for use in all data transfers and queries hereinafter described.

In any event, once the AMA record has been passed to the CDD, it is available for use in pricing the call. To this end, the AMA record is passed to a billing analysis system 112, which may be a general purpose computer capable of running the software necessary to implement the invention. The billing analysis system applies any customer specific billing parameters to the AMA record to produce a processed AMA record. It then passes both the AMA record and the processed AMA record back to the CDD for storage. A method for passing the data back to the CDD is disclosed in co-pending, commonly assigned, U.S. patent application Ser. No.: 08/607,983—entitled "Compression and Buffering of a Stream with Data Extraction Requirements"—which application is incorporated herein by reference."

The billing analysis system performs its functions the instant the switch passes the AMA record to the CDD (i.e. it performs call pricing in real-time). In order to achieve real-time processing of AMA records the invention must overcome two primary obstacles. First, the customer specific data is fragmented across multiple business units, with no cohesive notion of an integrated customer profile. This situation is depicted in FIG. 1a, which shows several customer profile databases 114, 116 and 118. As shown in the figure, the invention overcomes this obstacle through the use of an integrated customer profile database located within the billing analysis system. Software tools update the integrated customer profile database in response to updates of the individual customer profiles 114, 116 and 118 so that the integrated database always contains current information on all customers.

The volume of customer and telephone call data makes it difficult to store, rate, and query call data in real-time. To surmount this obstacle the invention accumulates summary information as each individual call (AMA) record is received and rated in real-time. It is generally desirable for a telephone network to maintain a customer's current bill.

Thus, one type of accumulated summary information may be current bills for each network customer. Nevertheless, it may be useful to accumulate other types of summary information for particular customers. The nature of the accumulated summary information for a particular customer depends upon the services subscribed to by that customer.

For example, a customer may subscribe to a plan in which calls made during the hours between 5:00pm and 9:00am receive a 10% discount; in which case it is useful to maintain a summary field containing the number of minutes of calls that the customer has made during the discount period.

In any case, the summary information is stored in a Summary Database (SD) 113 that is located within the billing analysis system. Thus, in this embodiment, AMA records and processed AMA records are stored in the CDD, while summary information is stored in the SD. Once summary information has been stored in SD 113, it is available for immediate access. It should be noted that many alternative storage schemes may be employed without departing from the spirit of the invention. For example, in one alternative scheme, AMA records are stored in the CDD, summary information are stored in the SD, and processed AMA records are stored in both the CDD and SD.

Figure 1B:
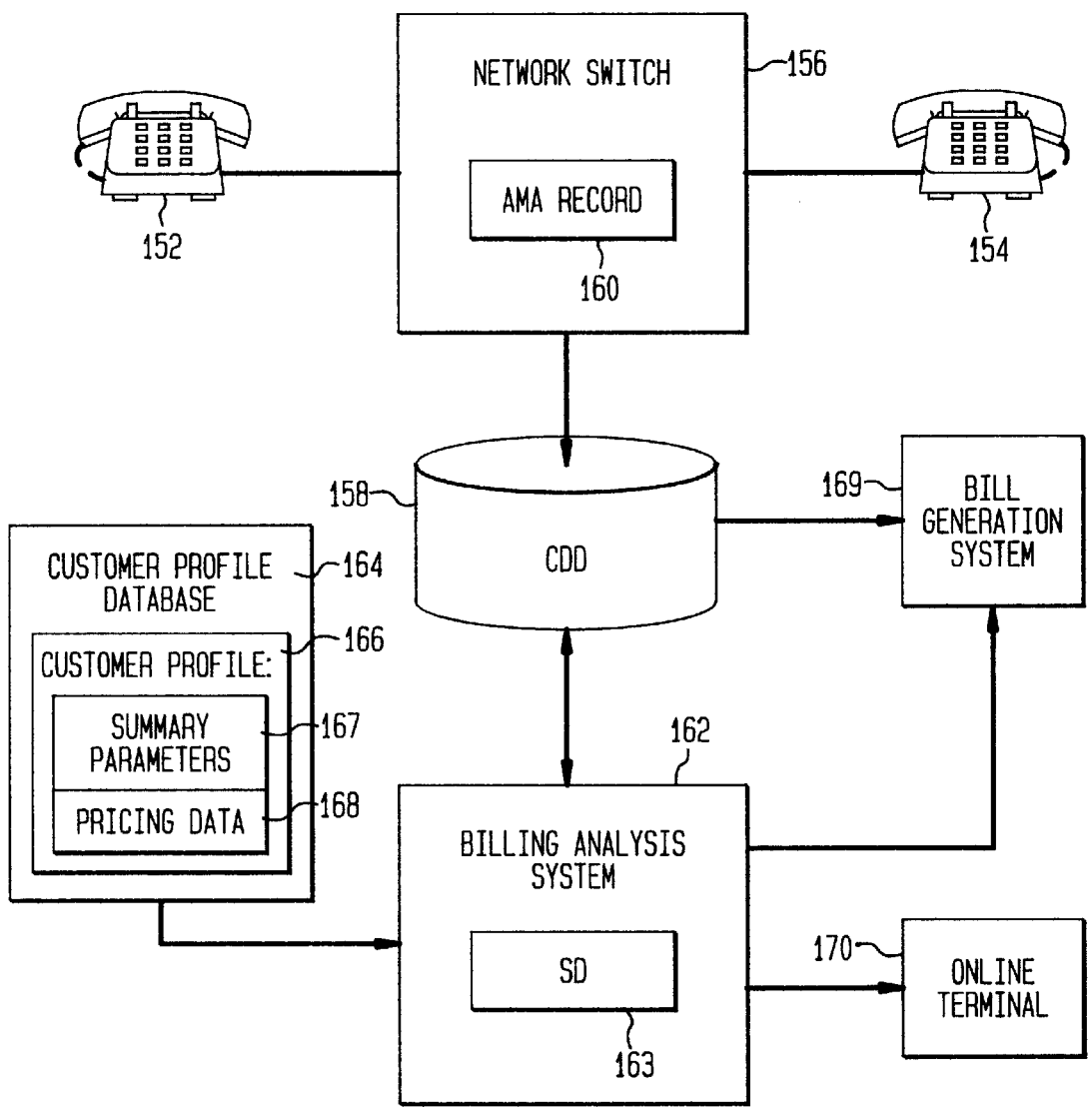
FIG. 1b is a block diagram of the telephone call billing system of FIG. 1a, showing a customer profile including summary parameters according to the present invention.

The processing involved in summary billing is shown in FIG. 1b, which, as an example, shows the present invention implemented in the telephone billing system of FIG. 1a. The present invention may be similarly implemented in the telephone billing systems shown in FIGS. 3 and 4.

A customer places calls from calling stations 152. Each call is routed through a network switch 156, which generates a corresponding AMA record 160. The AMA record includes an indication of the customer that placed the call. Typically the Automatic Number Identification (ANI) is used for this purpose. In an ANI system, the number of the telephone station from which a call is initiated is determined and used to identify the party who initiated the call. Each AMA record is passed to CDD 158, making the record available for call pricing. Each AMA record is passed from CDD 158 to billing analysis system 162, which applies the customer specific billing parameters contained in the attached customer profile database, such as database 164. The billing analysis system 162 then generates updates to summary information stored in the summary database (SD) 163 based on the customer profile 166 stored in customer profile database 164. The updates to the summary information are generated in real-time as calls are placed and AMA records generated. Updated summary information is available for access immediately after a summary information update is entered into SD 163. Thus, updated summary information may be accessed whenever desired. For example, a bill may be generated in real-time upon demand of a customer. Summary information stored in SD 163 may also be made available to customers without generating a bill. Snapshot summaries, of the current status of the customer's account, may be generated. In addition, online access to summary information may be provided, such as by online terminal 170.

Customer profile 166 includes summary parameters 167 that define the summary information that is to be generated and updated for the customer. Customers may subscribe to billing services which provide semi-custom summary information or fully custom summary information may be provided. The summary parameters may be defined directly by the customer, or the summary parameters may be defined based on summary information requested by the customer. Customer profile 166 also includes pricing data 168 that is used to price each telephone call. For example, summary parameters 167 may specify that summary information be compiled based on the number of call minutes since the last bill, the total cost of calls made on a particular day, or on each day, during the billing period, the total cost of calls made to each of a given set of numbers, area codes, cities, states, countries, etc. Likewise, summary information may be compiled based on the time or cost of calls in one or more discount plans, the savings provided by a discount plan, or based on the type of calls made, such as collect calls, etc.

Bills are generated by bill generation system 169 based on the summary information stored in SD 163, which depends on the summary parameters 167 in the customer profile. Bills may be generated periodically, on a predetermined schedule, whenever the generated summary information reaches a predetermined threshold, or bills may be generated whenever desired. If desired, detail information may be added to a bill by using the AMA records stored in CDD 158. Bill generation system 169 receives summary information from SD 163 and AMA records from CDD 158 and generates the bills based on the received information.

Figure 2:
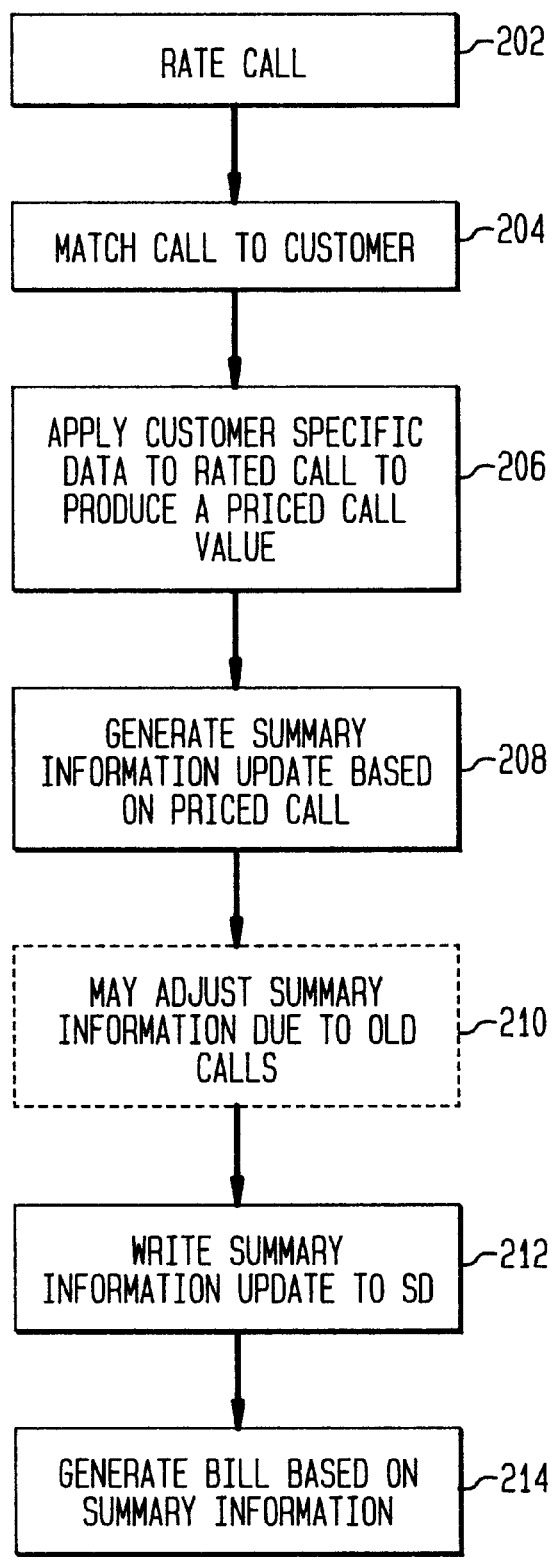
FIG. 2 is a flow diagram of the operation of a summary billing process according to the present invention.

FIG. 2 shows, in flowchart form, a procedure that a billing analysis system may use to perform summary billing processing for each call. In the following description of the flowchart references will be made to the embodiment shown in FIG. 1b.

Upon receiving an AMA record, such as 160a from CDD 158, the first step billing analysis system 162 takes is to rate the call (step 202). It must then match the rated call to the customer (step 204) so that customer specific parameters can be applied to the call. Several well known techniques can be used to match the rated call to the customer. One such technique uses Automatic Number Identification (ANI). In an ANI system, the number of the telephone station from which a call is initiated is determined and used to identify the party who initiated the call. Accordingly, in the FIG. 1b embodiment, the number of a telephone, such as 152a may be determined and passed to the billing analysis system along with the AMA record. The billing analysis system may then cross-reference the number to the customer profile containing the customer specific data to be used for the current call. For example, AMA record 160 is cross-referenced to customer profile 166, which also relates to that customer. Customer profile 166 contains customer specific pricing data 168 that is used to price the call, as well as summary parameters that define the summary information that is to be generated. Once the appropriate profile, or profiles, if there are multiple customer profile database, have been determined, the billing analysis system applies the pricing data contained in the profiles to the rated call to produce a priced call value (step 206). The billing analysis system then generates summary information updates defined by the summary parameters based on the priced call value (step 208). The priced call value (processed AMA record) is stored in the CDD and the summary information update for the customer is stored in the SD (step 212). As described in relation to FIG. 1a, an alternative scheme is to store both the priced call value and current bill—collectively termed "the priced call data"—in the SD; in which case, step 212 would involve storing the priced call value and the current bill in the SD. Finally, a bill is generated based on the summary information stored in the SD (step 214).

As an optional step in the procedure of FIG. 2, the billing analysis system may adjust charges for old calls to reflect certain types of billing plans (step 210). This requires that previously generated summary information be retroactively adjusted. Any such adjustments are defined in the summary parameters.

Figure 3:
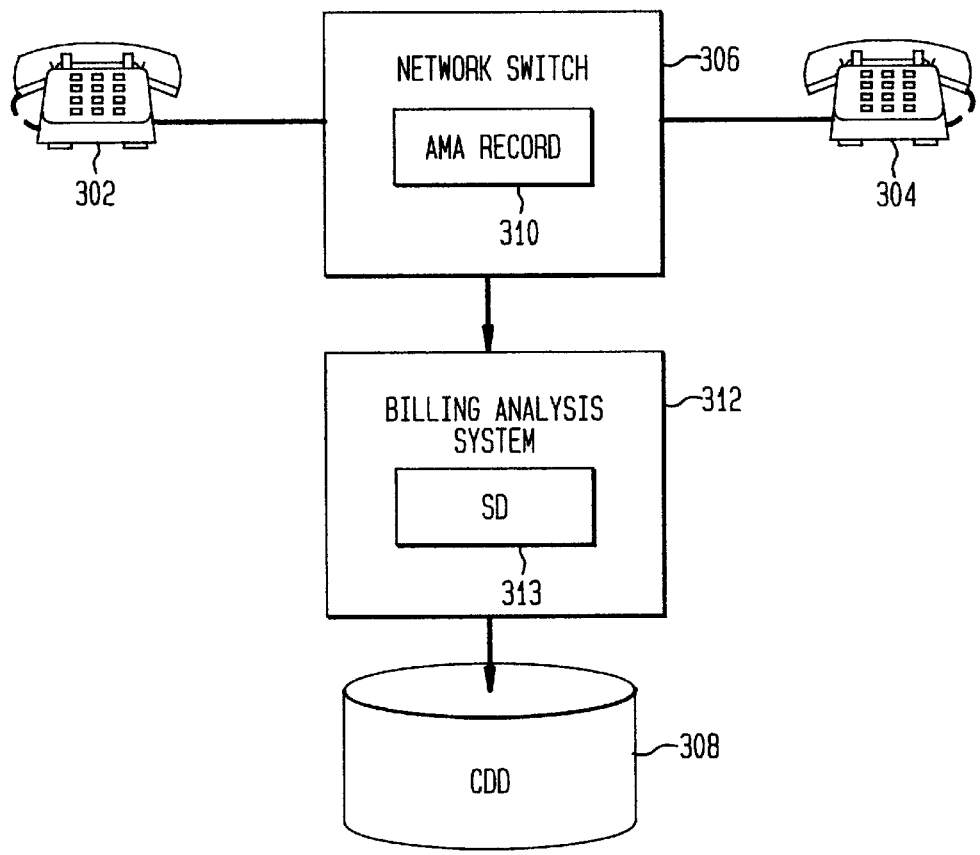
FIG. 3 is a block diagram of another embodiment a telephone call billing system, in which the present invention may be implemented.

Referring now to FIG. 3, there is shown an alternative embodiment of a telephone system in accordance with the present invention. The customer profiles are not shown, but are similar to those shown in FIG. 1b. As shown in the figure, a call may be initiated at a first telephone 302 and directed to a second telephone 304. The call is routed by a network switch 306, which generates an AMA record 310 for the call. The AMA record is passed to a billing analysis system 312 which applies customer specific pricing data to the AMA record to produce a processed AMA record. The AMA record and processed AMA record are then passed to a CDD 308 for storage.

Like the billing analysis system of FIG. 1b, the billing analysis system of FIG. 3 includes a SD 313. The billing analysis system of FIG. 3 also includes an integrated customer profile—although, it should be noted that for simplicity of presentation the individual customer profile databases and the bill generation system are not shown in FIG. 3, nor in the figures that follow. Also, like the billing analysis system of FIG. 1a, the billing analysis system of FIG. 3 accumulates summary information as each individual call record is received and rated in real-time, the summary information being stored in the SD 313. As in the prior described embodiment, alternative schemes may be employed for the storage of the AMA records, processed AMA records, and summary information.

Figure 4:
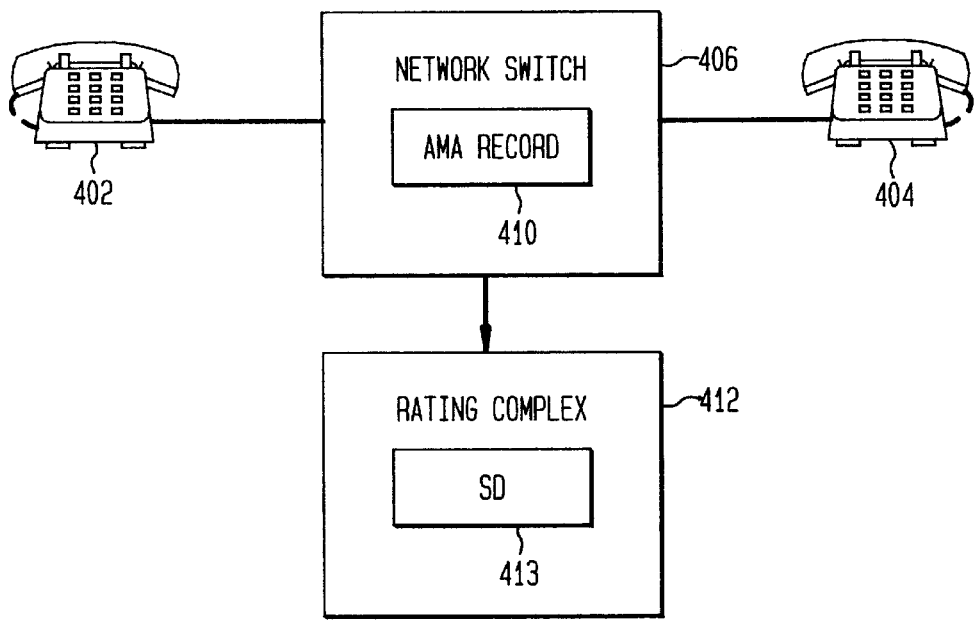
FIG. 4 is a block diagram of another embodiment a telephone call billing system, in which the present invention may be implemented.

FIG. 4 shows another embodiment of a telephone system in accordance with the present invention. The customer profiles are not shown, but are similar to those shown in FIG. 1b. In the FIG. 4 embodiment, as in the previous embodiments, a call initiated at a first telephone 402 may be directed to a second telephone 404 through a network switch 406, which generates an AMA record 410. However, in the FIG. 4 embodiment the AMA record is passed to a Rating Complex (RC) 412. The RC is a unit which performs the functions of the CDD and billing analysis system, and may therefore be characterized as a combined CDD and billing analysis system. As shown in the figure, the RC may include a SD 413 for storing the summary information separately from the AMA records and processed AMA records. As in the prior described embodiments, alternative schemes may be employed for the storage of the AMA records, processed AMA records, and summary information.

It should be noted that although all three embodiments discussed above depict a call as being initiated from a first telephone and directed to a second telephone, it is possible that calls may be initiated by, and directed to, many different types of communication devices. For example, a call may be initiated by a fax machine and directed to a personal computer. Moreover, a call may be initiated by a single communication device and directed to multiple communication devices. For example, a call may be initiated by a fax machine and directed to multiple independent personal computers. For purposes of this description, each instance of a single initiating call being directed to a different terminating device will be considered an independent call.

Although specific embodiments of the present invention have been described, it will be understood by those of skill in the art that there are other embodiments which are equivalent to the described embodiments. Accordingly, it is to be understood that the invention is not to be limited by the specific illustrated embodiments, but only by the scope of the appended claims.

What is claimed is:

1. A method of billing for telephone service comprising the steps of:

receiving summary parameters defined by a customer, the summary parameters defining summary information that is to be generated;

storing customer specific data including pricing data and summary parameters for the customer;

generating a plurality of records, each record describing a telephone call;

in response to receiving each record at a billing analysis system performing the step of:

determining a priced call value for each call using the records and the customer specific data; and generating summary information that is specified by the summary parameters using the records and the priced call values.

2. The method of claim 1, further comprising the step of:

generating a telephone bill for the customer based on the summary information for the customer.

3. The method of claim 2, wherein the telephone bill is generated periodically.

4. The method of claim 2, wherein the telephone bill is generated based on a predetermined schedule.

5. The method of claim 2, wherein the telephone bill is generated when at least a portion of the summary information reaches a predetermined threshold.

6. The method of claim 2, wherein the telephone bill is generated in real-time upon demand of the customer.

7. The method of claim 1, further comprising the step of:

providing real-time access to the summary information to the customer.

8. The method of claim 1, wherein the summary parameters are defined by the customer.

9. The method of claim 1, wherein the summary parameters are defined based on a request from the customer.

10. A system for billing for telephone service comprising:

a database storing customer specific data including pricing data and summary parameters for a customer the summary parameters defined by the customer and defining summary information that is to be generated;

a network switch generating a plurality of records, each record describing a telephone call; and a billing analysis system receiving the records, and in response to receiving each record, accessing the database to obtain the customer specific data, determining a priced call value for each call using the record and the pricing data, and generating summary information that is specified by the summary parameters using the records and the priced call values.

11. The system of claim 10, further comprising:

a bill generation device generating a telephone bill for the customer based on the summary information for the customer.

12. The system of claim 11, wherein the telephone bill is generated periodically.

13. The system of claim 11, wherein the telephone bill is generated based on a predetermined schedule.

14. The system of claim 11, wherein the telephone bill is generated when at least a portion of the summary information reaches a predetermined threshold.

15. The system of claim 11, wherein the telephone bill is generated in real-time upon demand of the customer.

16. The system of claim 10, further comprising the step of:

an access device providing real-time access to the summary information to the customer.

17. The system of claim 10, wherein the summary parameters are defined by the customer.

18. The system of claim 10, wherein the summary parameters are defined based on a request from the customer.

19. A system for billing for telephone service comprising:

means for receiving summary parameters defined by a customer, the summary parameters defining summary information that is to be generated;

means for storing customer specific data including pricing data and summary parameters for the customer;

means for generating a plurality of records, each record describing a telephone call;

means for receiving the records;

means, responsive to receipt of each record, for determining a priced call value for each call using the records and the customer specific data and generating summary information that is specified by the summary parameters using the records and the priced call values.

20. The system of claim 19, further comprising:

means for generating a telephone bill for the customer based on the summary information for the customer.

21. The system of claim 20, wherein the telephone bill is generated periodically.

22. The system of claim 20, wherein the telephone bill is generated based on a predetermined schedule.

23. The system of claim 20, wherein the telephone bill is generated when at least a portion of the summary information reaches a predetermined threshold.

24. The system of claim 20, wherein the telephone bill is generated in real-time upon demand of the customer.

25. The system of claim 19, further comprising the step of:

means for providing real-time access to the summary information to the customer.

26. The system of claim 19, wherein the summary parameters are defined by the customer.

27. The system of claim 19, wherein the summary parameters are defined based on a request from the customer.

* * * * *